United States Patent
Priest et al.

(10) Patent No.: US 10,301,873 B2
(45) Date of Patent: May 28, 2019

(54) CLIMBING STICK SYSTEM

(71) Applicant: DDI, Inc., Dubuque, IA (US)

(72) Inventors: John Brian Priest, Dubuque, IA (US);
Andrae T. D'Acquisto, Bellevue, IA (US); Cody Joseph D'Acquisto, Bellevue, IA (US)

(*) Notice: Subject to any disclaimer, the term of this patent is extended or adjusted under 35 U.S.C. 154(b) by 97 days.

(21) Appl. No.: 14/928,866

(22) Filed: Oct. 30, 2015

(65) Prior Publication Data

US 2017/0122031 A1    May 4, 2017

(51) Int. Cl.
| | |
|---|---|
| *E06C 1/38* | (2006.01) |
| *E06C 1/08* | (2006.01) |
| *E06C 1/34* | (2006.01) |
| *A63B 27/00* | (2006.01) |
| *E06C 1/387* | (2006.01) |
| *A01M 31/02* | (2006.01) |
| *E06C 7/18* | (2006.01) |

(52) U.S. Cl.
CPC ............ *E06C 1/381* (2013.01); *A01M 31/02* (2013.01); *A63B 27/00* (2013.01); *E06C 1/08* (2013.01); *E06C 1/34* (2013.01); *E06C 1/387* (2013.01); *A63B 2210/50* (2013.01); *E06C 7/188* (2013.01)

(58) Field of Classification Search
CPC ............ E06C 1/08; E06C 1/381; E06C 1/387; A01M 31/02
See application file for complete search history.

(56) References Cited

U.S. PATENT DOCUMENTS

| | | | | |
|---|---|---|---|---|
| 646,291 | A * | 3/1900 | Krueger | E06C 1/381 182/156 |
| 826,863 | A * | 7/1906 | Lynch | E06C 1/381 182/178.1 |
| 4,069,892 | A * | 1/1978 | Lynne | E06C 1/381 182/189 |
| 4,844,207 | A * | 7/1989 | Andrews | E06C 1/381 182/100 |
| 5,109,954 | A * | 5/1992 | Skyba | E06C 1/10 182/100 |
| 8,556,035 | B1 * | 10/2013 | Kendall | E06C 1/381 182/156 |
| 9,151,112 | B2 * | 10/2015 | Niemela | E06C 1/04 |
| 9,631,428 | B2 * | 4/2017 | Niemela | E06C 1/381 |
| 2012/0125715 | A1 * | 5/2012 | Furseth | E06C 1/381 182/194 |

(Continued)

FOREIGN PATENT DOCUMENTS

| | | | | |
|---|---|---|---|---|
| WO | WO 9724506 A1 * | 7/1997 | | E06C 1/10 |
| WO | WO 2007080625 A1 * | 7/2007 | | E06C 1/36 |

*Primary Examiner* — Colleen M Chavchavadze
(74) *Attorney, Agent, or Firm* — Rathe Lindenbaum LLP

(57) ABSTRACT

A climbing stick system includes the first climbing stick and a second climbing stick. The first climbing stick includes a first step support having a cavity and a mouth leading to the cavity and first steps coupled to the first step support. The second climbing stick includes a second step support, second steps coupled to the second step support and a locking member having a head. One of the mouth and the locking member is rotatable between a locked position in which the head is locked within the cavity to retain the first climbing stick with respect to the second climbing stick and an unlocked position to facilitate separation of the first climbing stick and the second climbing stick.

20 Claims, 13 Drawing Sheets

(56) References Cited

U.S. PATENT DOCUMENTS

2016/0024843 A1* 1/2016 Niemela ................ E06C 7/188
  182/129
2016/0069133 A1* 3/2016 Priest ..................... E06C 1/381
  182/189

* cited by examiner

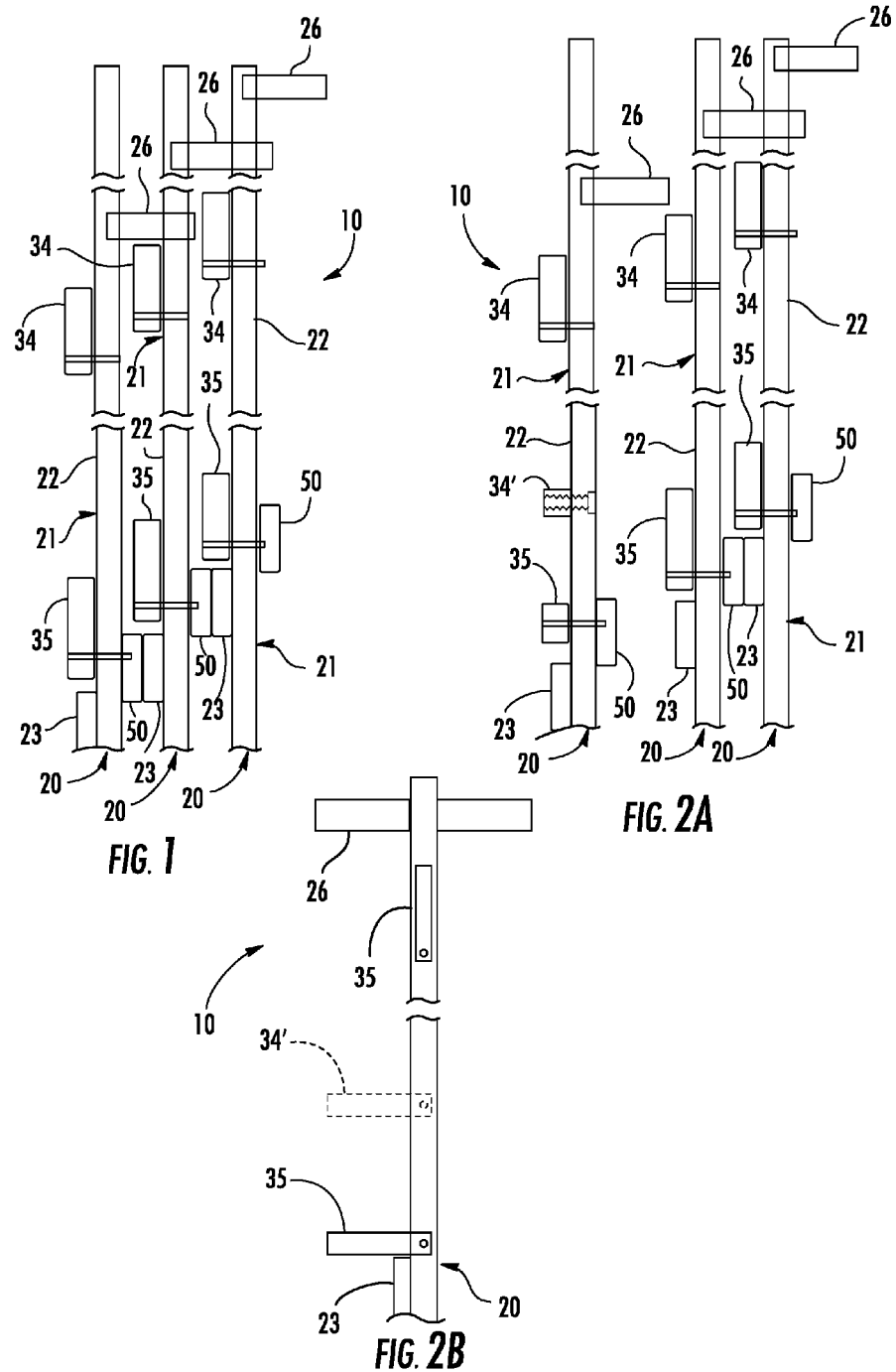

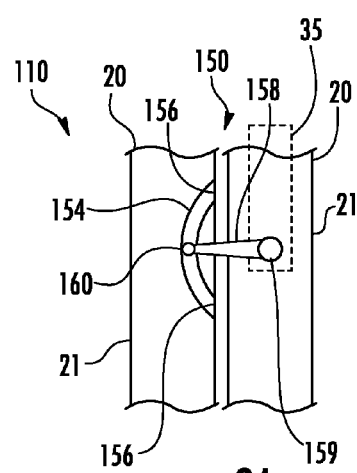
FIG. 3A
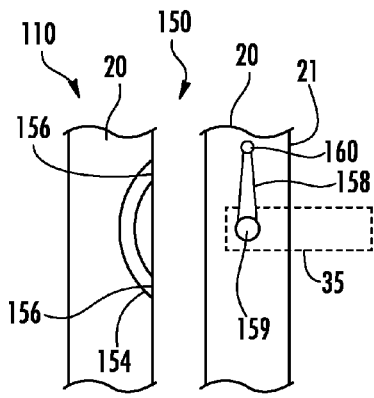
FIG. 3B
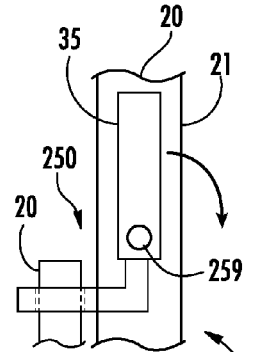
FIG. 4A
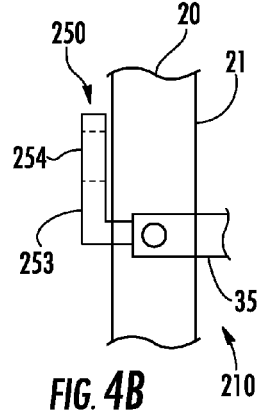
FIG. 4B
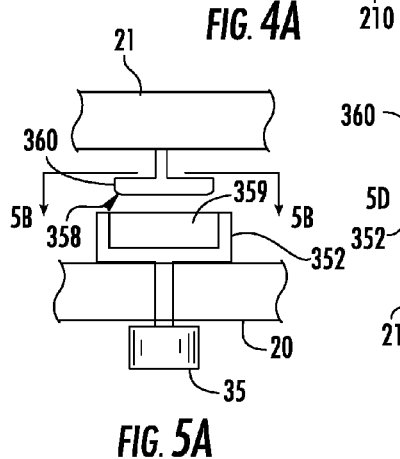
FIG. 5A
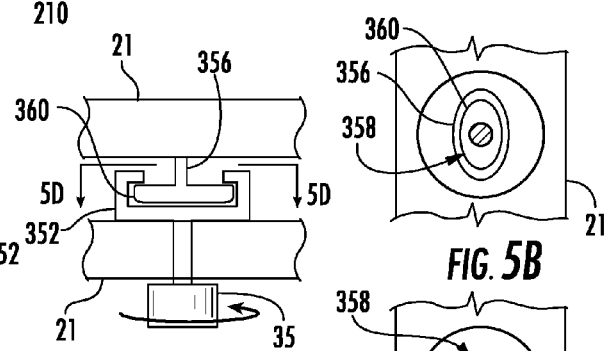
FIG. 5C
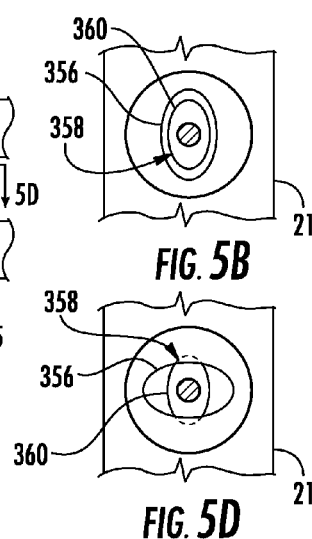
FIG. 5B
FIG. 5D

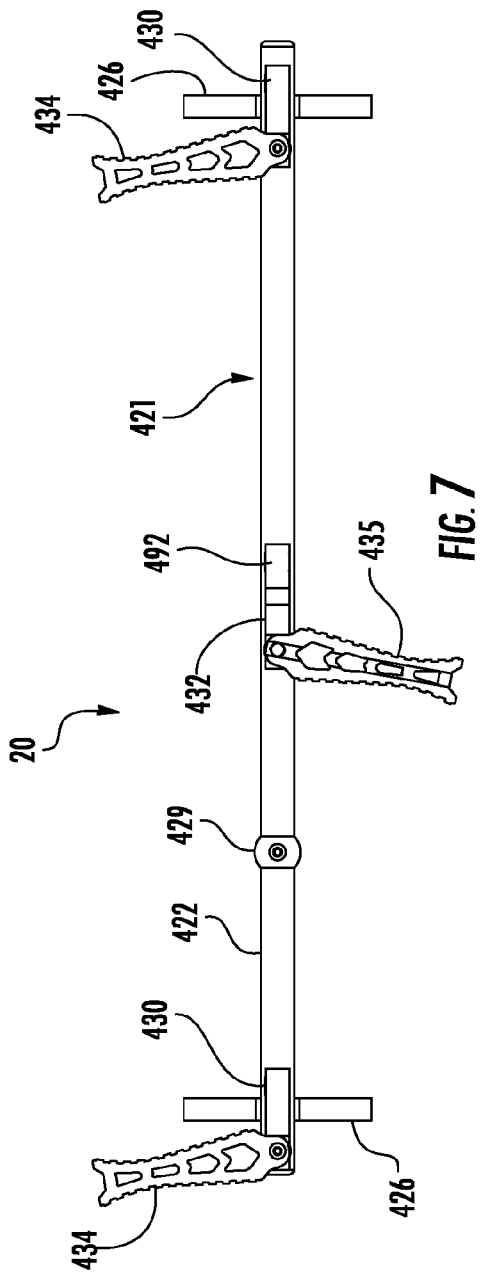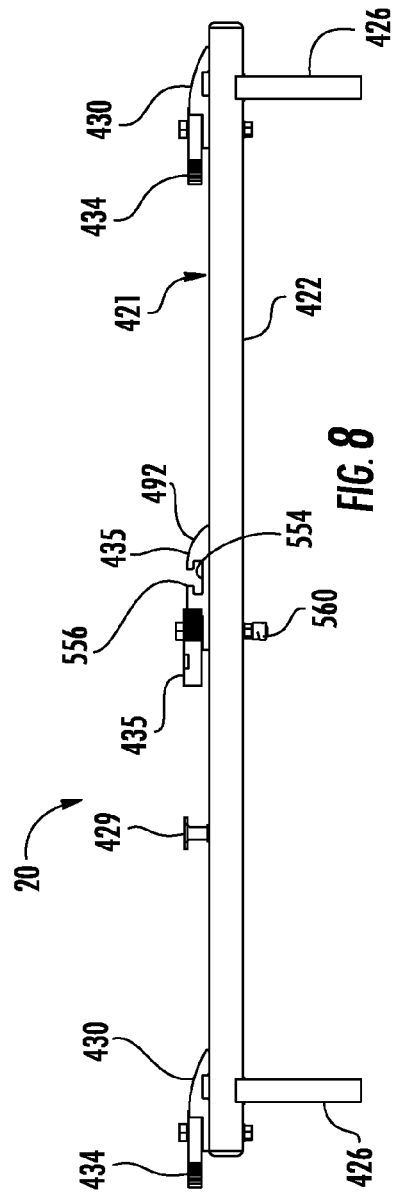

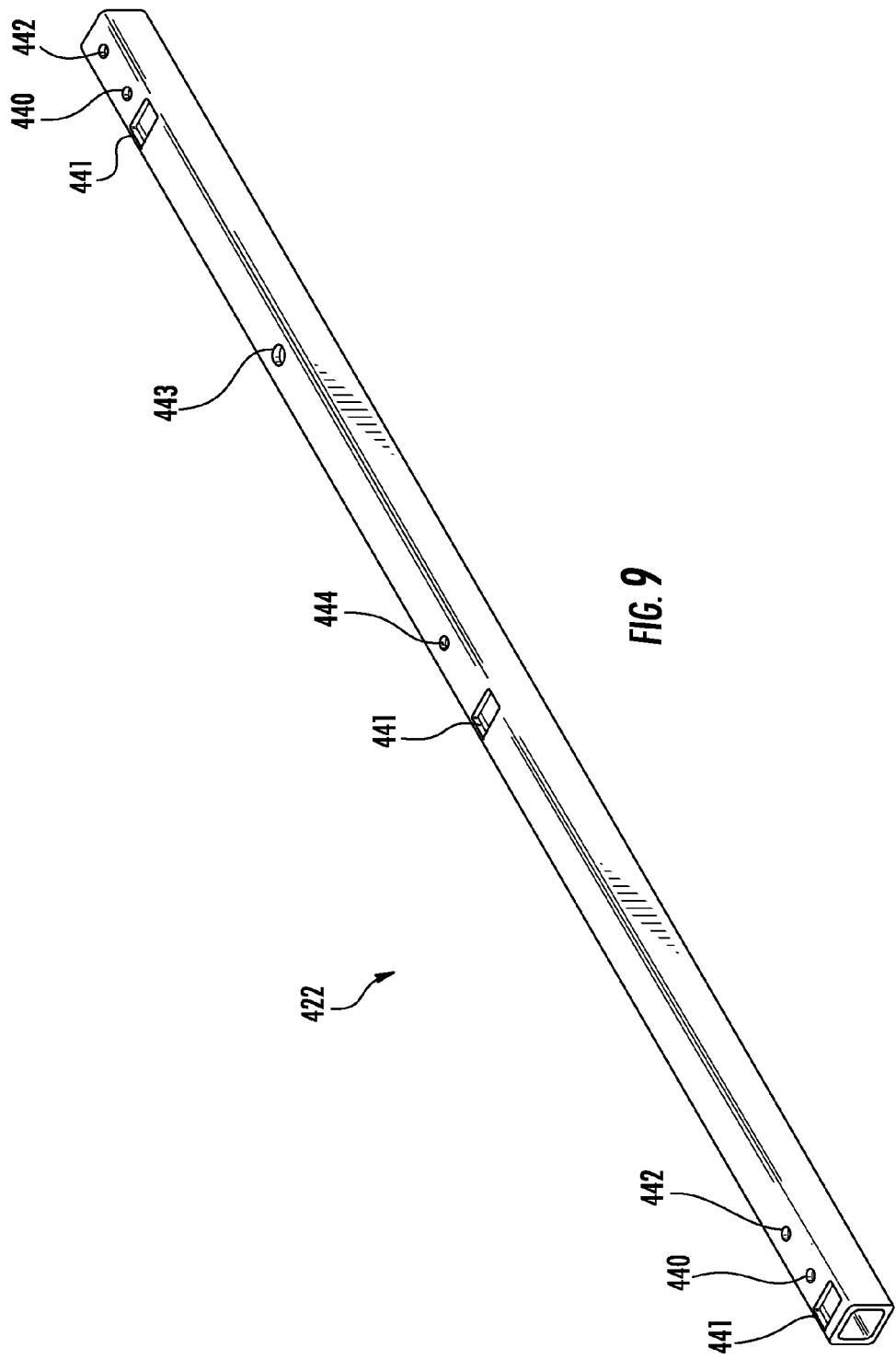

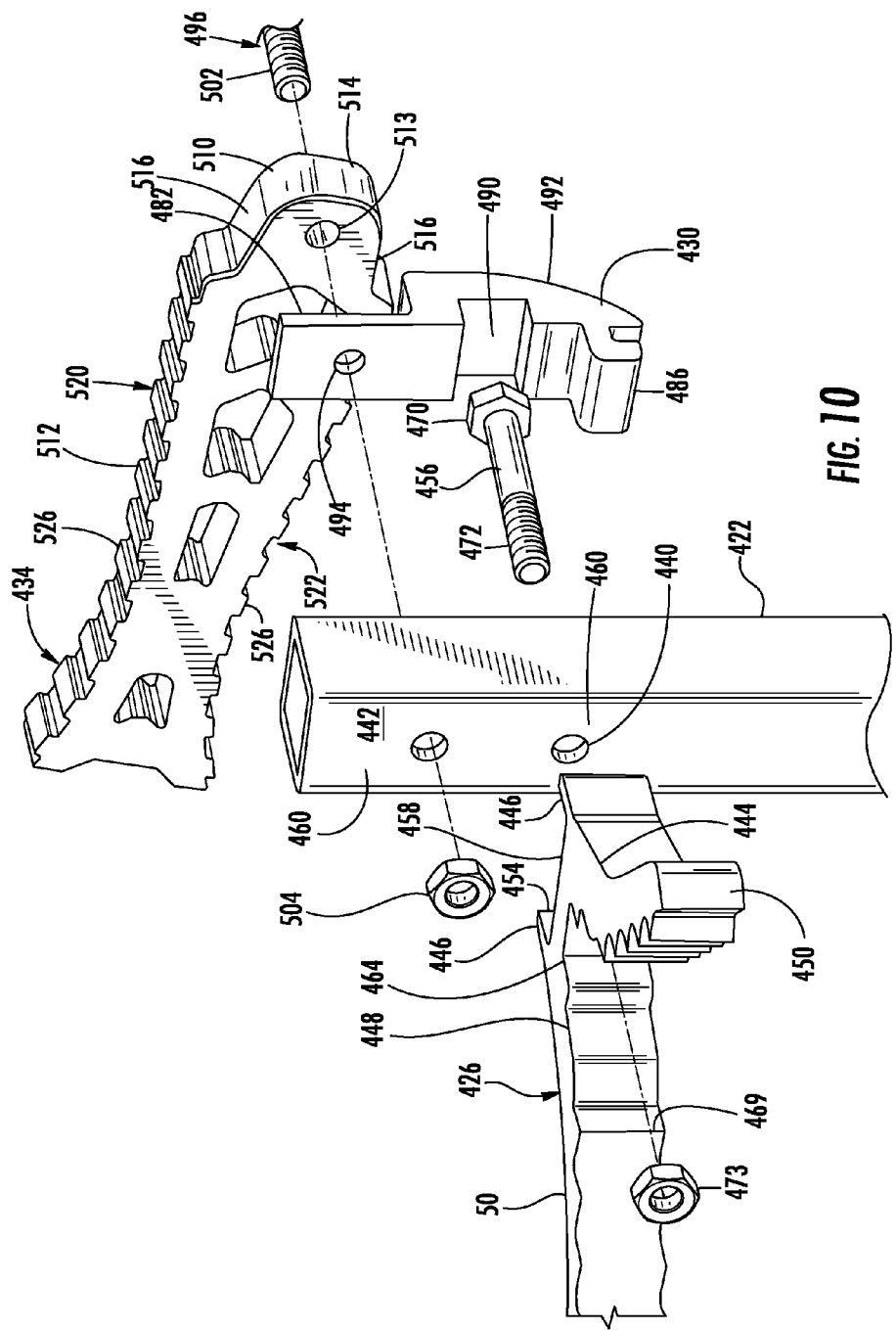

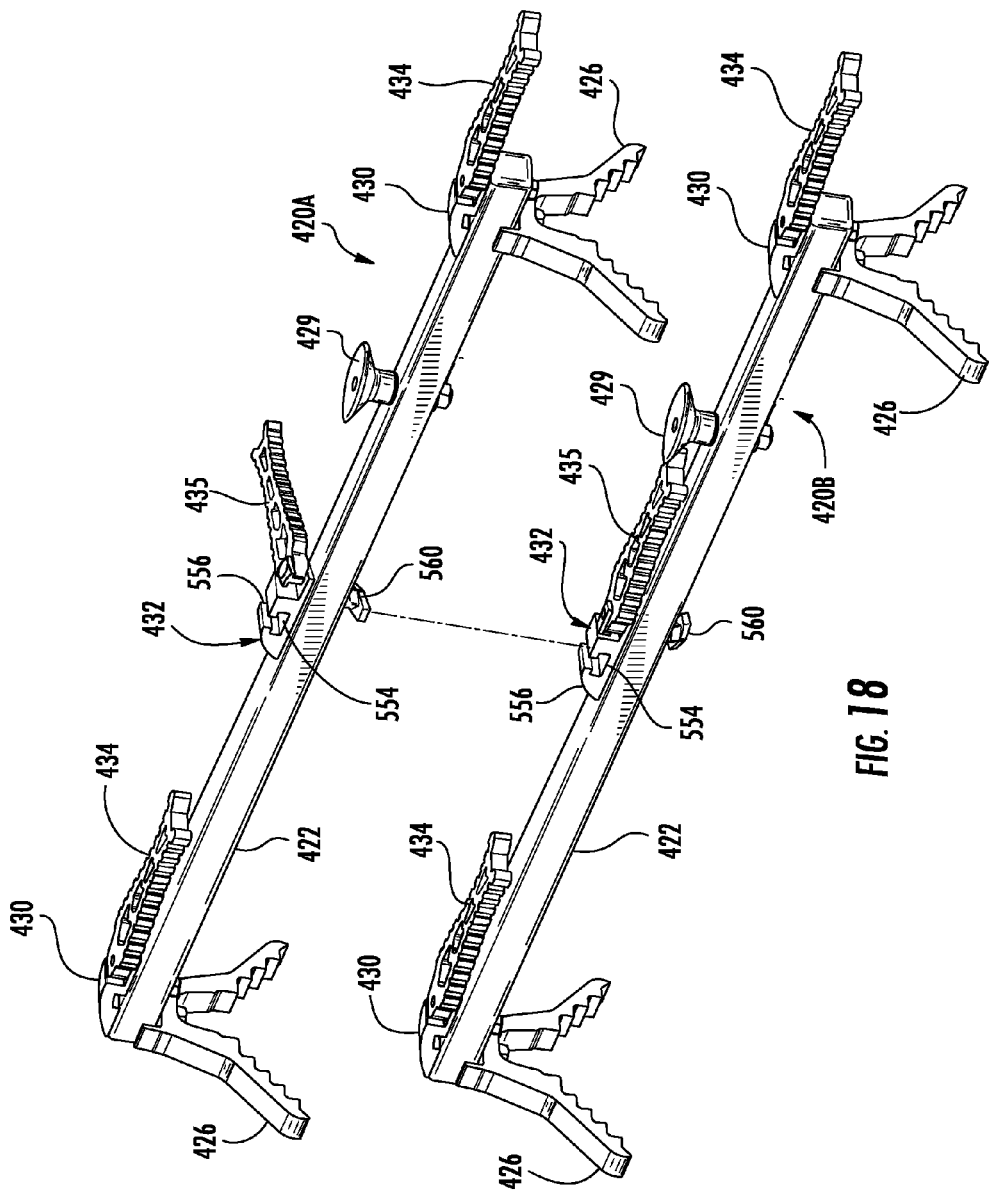

CLIMBING STICK SYSTEM

CROSS-REFERENCE TO RELATED PATENT APPLICATIONS

The present application is related to co-pending U.S. patent application Ser. No. 14/848,157 filed on Sep. 8, 2015 by John Brian Priest et al. and entitled TREE CLIMBING STICK, the full disclosure of which is hereby incorporated by reference.

BACKGROUND

Tree climbing sticks are typically mounted along a tree and serve as a ladder for a person to reach a higher tree stand for wildlife observation or hunting. As such tree climbing sticks are often used in remote areas, transporting such clique tree climbing sticks and tree stands is often difficult.

BRIEF DESCRIPTION OF THE DRAWINGS

FIG. 1 is a side view schematically illustrating an example tree climbing stick system illustrating multiple tree climbing sticks releasably interconnected.

FIG. 2A is a side view schematically illustrating the example tree climbing stick system of FIG. 1 illustrating disconnection and separation of one of the tree climbing sticks.

FIG. 2B is a front view of the example tree climbing stick system of FIG. 2A.

FIG. 3A is a schematic diagram of another example tree climbing stick system illustrating two climbing sticks interlocked.

FIG. 3B is a schematic diagram of the example tree climbing stick system of FIG. 3A illustrating the two climbing sticks disconnected from one another.

FIG. 4A is a schematic diagram of another example tree climbing stick system illustrating two climbing sticks interconnected.

FIG. 4B is a schematic diagram of the example tree climbing stick system of FIG. 4A illustrating the two climbing sticks disconnected from one another.

FIG. 5A is a schematic diagram of another example tree climbing stick system illustrating two climbing sticks disconnected from one another.

FIG. 5B is a sectional view of the example tree climbing stick system of FIG. 5A taken along line 5B-5B.

FIG. 5C is a schematic diagram of another example tree climbing stick system illustrating two interconnected climbing sticks interconnected.

FIG. 5D is a sectional view of the example tree climbing stick system of FIG. 5C taken along line 5D-5D.

FIG. 7 is a front view of the tree climbing stick of FIG. 6 in an in-use state.

FIG. 8 is a side view of the tree climbing stick of FIG. 6 in the in-use state.

FIG. 9 is a perspective view of an example post of the example tree climbing stick of FIG. 6.

FIG. 10 is an exploded fragmentary perspective view of a first portion of the example tree climbing stick of FIG. 6.

FIG. 17 illustrating two example climbing sticks connected to one another.

FIG. 18 is a perspective view of the example tree climbing stick system of FIG. 17; FIG. 18 illustrating the two example climbing sticks disconnected and separated from one another.

DETAILED DESCRIPTION OF EXAMPLES

Figure 6:
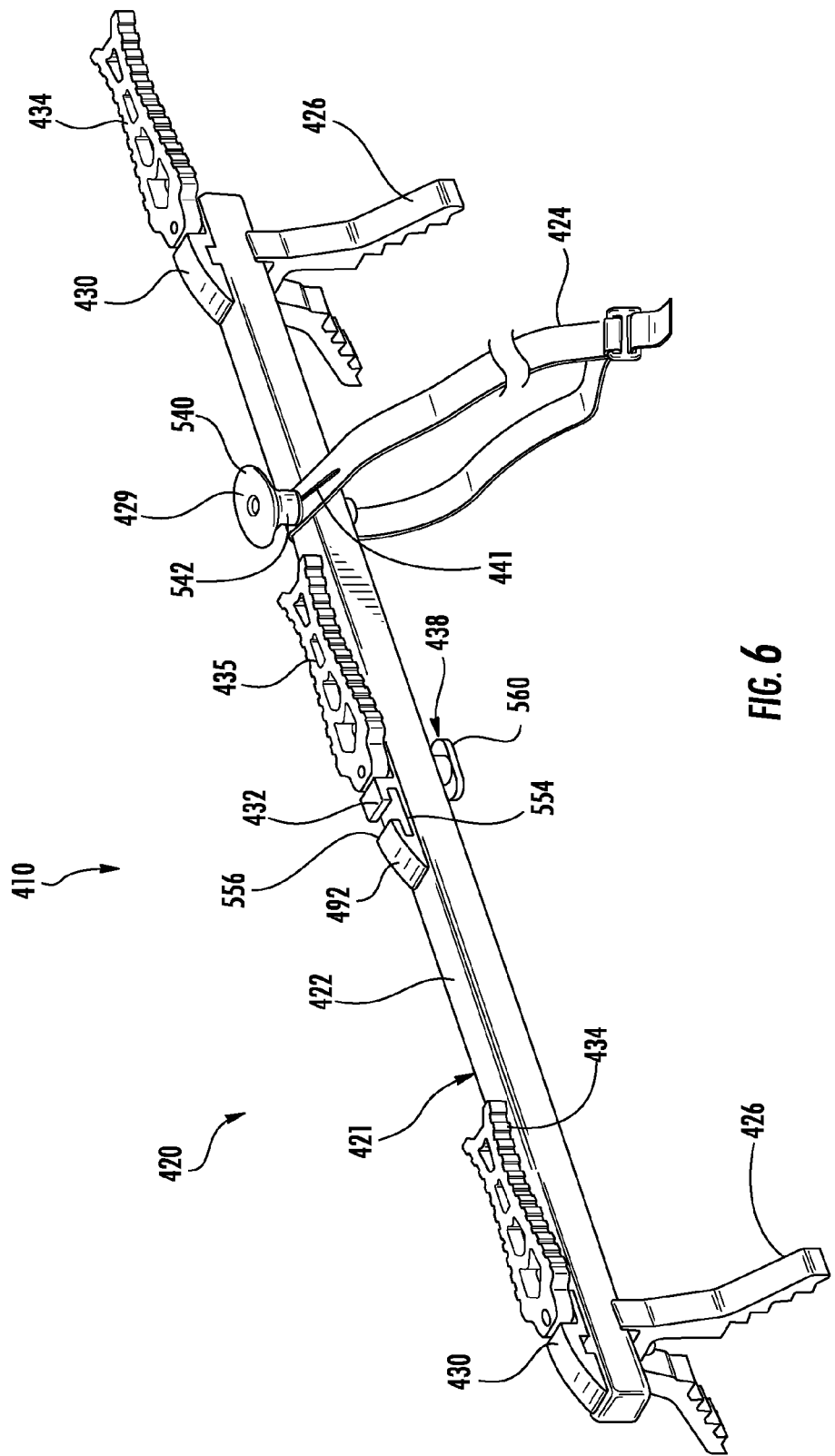
FIG. 6 is a perspective view of another example tree climbing stick system, FIG. 6 illustrating a single example climbing stick of the system.

The present disclosure illustrates multiple variations of example tree climbing stick systems comprising multiple individual climbing sticks releasably connected to one another to facilitate ease of storage and ease of transport. In each of the illustrated examples, the individual tree climbing sticks are releasably connected to one another without extraneous or additional fasteners or other components which might otherwise become separated and lost when the sticks are separated and being used. In other words, interconnect the individual climbing sticks are carried by and form part of the individual climbing sticks.

FIGS. 1-2 (FIGS. 2A and 2B) schematically illustrate an example tree climbing stick system comprising multiple individual climbing sticks 20. FIG. 1 is a side view of system 10 illustrating one example of how the individual climb sticks 20 are interconnected and stacked relative to one another. As shown by FIG. 1, climbing sticks 20, when stacked and locked to one another, are in a staggered or offset relationship to one another. FIGS. 2A and 2B illustrate disconnection and separation of one of the individual climbing sticks 20 from the stack of system 10. FIG. 2A is a side view while FIG. 2B is a front view of system 10 with one of climbing sticks 20 being separated.

As shown by FIGS. 1-2, each climbing stick 20 comprises a step support 21, a pair of tree gripping claws 26 (one of which is shown for each stick 20), climbing steps 34 (one of which is shown for each stick 20), a lever step 35 and an inter-stick locking mechanism 50. Step support 21 comprises an elongated structure configured to extend along the generally vertical axis of a tree or other structure. Step support 21 supports tree gripping claws 26 at opposite ends. Step support 21 further supports a vertical series of steps 34, 35. In the example illustrated, step support 21 rotatably support each of steps 34, 35, wherein each of steps 34, 35 are rotatable between a vertical orientation (as shown in FIG. 1) in which the major dimension or longitudinal length of each of steps 34, 35 extends parallel to the major dimension or longitudinal length of each of steps supports 21 and a horizontal or extended orientation (as shown by lever step 35 in FIG. 2B) in which the major dimension or longitudinal axis of each step 35 is supported while extending in a generally horizontal orientation, generally perpendicular to the longitudinal or major dimension of step support 21. In such an implementation, step support 21 may comprise a shoulder to support steps 34, 35 in the extended or horizontal orientation.

In one implementation, step support 21 is formed from multiple components mounted to one another. For example, in one implementation, step support 21 comprises a post 22 in a separate structure 23 post 22 to be engaged by inter-stick locking mechanism 50. In yet another implementation, step support 21 is provided by a single unitary body structure. For example, in one implementation, post 22 and structure 23 are integrally formed as a single unitary body. In some implementations, structure 23, whether mounted to post 22 or whether integrally formed as a single unitary body with post 22, serve as a stop, providing a shoulder for supporting the otherwise rotatable lever step 35 when lever step 35 is in a horizontal or extended orientation. In yet another implementations, step support 21 fixedly supports steps 34 in an extended or horizontal orientation.

Tree gripping claws 26 each comprises a generally V-shaped bracket extending from step support 21. In one implementation, claws 26 are mounted to support 21. In another implementation, claws 26 are welded or molded as part of support 21. In the example illustrated, when sticks 20 are stacked and interconnected, tree gripping claws 26 at least partially receive portions of the step support 21 of another tree stick 20. In one implementation, tree gripping claws 26 extend into close proximity or contact with opposite sides of step support 21 of an adjacent stick 20 to restrict sideways movement (in directions in and out of the drawing illustration) of the adjacent stick 20 relative to the sticks 20 from which claws 26 extend.

Steps 34 comprise structures upon which a climber may rest his or her feet when climbing a tree using climbing sticks 20. In one implementation, each stick 20 comprises at least two steps 34. In one implementation, step 34 are rotatable between vertical and horizontal orientations, parallel and perpendicular to the longitudinal or major dimension of stick 20. In other implementations, steps 34 or alternatively fixedly maintained in a horizontal orientation.

Lever step 35 is similar to an individual step 34 except that lever step 35 is operably coupled to inter-stick locking mechanism 50 such that rotational movement of lever step 35 transmits motion or torque to inter-stick locking mechanism 50 so as to actuate inter-stick locking mechanism 50 between a locking state and an unlocked state. In one implementation, lever step 35 has generally the same dimensions as each of steps 34. In one implementation, lever step 35 has a length of at least 3 inches and preferentially at least 5 inches to accommodate full width of a person's footwear, shoes, boots or the like. As with steps 34, in one implementation, lever step 35 comprises teeth, grooves, ribs or otherwise irregular or in roughened surface to reduce chances of slippage when lever step 35 is being climbed upon. In one implementation, lever step 35 has a slightly concave surface to facilitate centering of a person's foot upon lever step 35. Lever step 35 serve dual purposes, serving as both a step and a lever mechanism for actuating inter-stick locking mechanism 50. As a result, the number of components, complexity, cost, size and weight of each climbing stick 20 are reduced.

In one implementation, lever step 35 actuates inter-stick locking mechanism 50 to the locking state when lever step 35 has been rotated to a vertical orientation, parallel to the major dimension of support 21 and stick 20. In such an implementation, lever step 35 actuates inter-stick locking mechanism 50 to the unlocked state when lever step 35 has been rotated to the extended or horizontal orientation, substantially perpendicular to the major dimension of support 21 and stick 20.

In one implementation, lever step 35 is operably coupled to inter-stick locking mechanism 50 by a shaft, such as a shaft of a bolt, extending through support 21. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. In other implementations, lever step 35 is operably coupled to inter-stick locking mechanism 50 in other fashions.

Inter-stick locking mechanism 50 comprises a mechanism that is actuatable to lock and unlock two adjacent tree climbing sticks 20 with respect to one another. Inter-stick locking mechanism 50 is actuatable between a locked position and an unlocked position in response to rotation of lever step 35. FIG. 1 illustrates inter-stick locking mechanism 50 in a locked state in which each stick 20 is locked to are connected to an adjacent stick 20. FIG. 1 illustrates such locking occurring when lever stick 35 is in a vertical orientation, aligned with the length of stick 20. FIGS. 2A and 2B illustrate inter-stick locking mechanism 50 in an unlocked state, after lever step 35 as an rotated to the substantially horizontal orientation, extending substantially perpendicular to the longitudinal length of stick 20. As shown by FIG. 2A, the result is that mechanism 50, actuated to the unlocked state, allows its associated stick 20 to be separated from the interconnected stack of sticks 20.

In one implementation, inter-stick locking mechanism 50 comprises a cavity connected to a first climbing stick and having an asymmetric mouth leading to the cavity, wherein the cavity and the mouth rotate in response to rotation of lever step 35. The cavity and the mouth rotate between a first unlocked position in which the mouth is able to receive and asymmetrically shaped head projecting from a second climbing stick 20 or wherein the head may be withdrawn from the cavity and a second locked position in which the asymmetrically shaped head is out of alignment with the asymmetrically shaped mouth while the head is within the cavity such that he had cannot be moved through the mouth and such that the head is captured within the cavity to retain or lock the first stick and the second stick relative to one another.

In another implementation, the inter-stick locking mechanism 50 has the same configuration as described above, but wherein the asymmetrically shaped head is operably coupled to the lever step 35 such that rotation of lever step 35 rotates asymmetrically shaped head between a locked position and an unlocked position. In particular, rotation of lever step 35 rotates the asymmetrically shaped head between a first unlocked position in which the head is able to move through the asymmetrically shaped mouth of the other stick for insertion or withdrawal of the head into and out of the cavity and a second locked position in which the asymmetrically shaped head is out of alignment with the asymmetrically shaped mouth while the head is within the cavity such that had cannot be moved through the mouth and such that the head is captured within the cavity to retain or lock the first stick and the second stick relative to one another.

In other implementations, inter-stick locking mechanism 50 may other configurations that facilitate selective locking and unlocking of two adjacent tree climbing sticks with respect to one another. As illustrated by broken lines in FIG. 2B, in some implementations, lever step 35 may alternatively be replaced with a step 34', similar to steps 34, wherein step lever 35 is replaced with an alternative lever, the smaller size, not serving as a step, wherein the alternative lever is operably coupled to inter-stick locking mechanism 50 to selectively actuate inter-stick locking mechanism 50 between the locked and unlocked states.

FIGS. 3A and 3B schematically illustrate tree climbing stick system 110, another example implementation of tree climbing stick system 10. System 110 is similar to system 10 except that system 110 comprises inter-stick locking mechanism 150, another example of inter-stick locking mechanism 50. Those remaining components of system 110 which correspond to system 10 are numbered similarly in FIGS. 3A, 3B or are shown in FIG. 1.

Inter-stick locking mechanism 150 comprises a cavity, in the form of an arcuate channel 154 formed along a side of step support 21, such as a post, of a first stick 20. Channel 154 comprises two mouths 156. Inter-stick locking mechanism 150 further comprises an arm or shaft 158 pivotably or rotatably connected to a side of a step support 21 of a second stick 20 for rotation about a pivot axis 159, wherein the shaft 158 supports a head 160 which is rotatable along an arc into and out of mouths 156 along and within channel 154. In the example illustrated, shaft 158 is further operably coupled to lever step 35 by a pin, shaft of the like extending through step support 21, wherein rotation of lever step 35 rotates shaft 158 and its head 160, which form a rotational latch, as shown in FIGS. 3A and 3B. FIG. 3A illustrates head 160 received within channel 154 to lock and secure the two adjacent sticks 20 relative to one another. FIG. 3B illustrates the head 160 withdrawn from channel 154, allowing the two adjacent sticks 20 to be withdrawn and separated from one another.

FIGS. 4A and 4B schematically illustrate tree climbing stick system 210, another example implementation of tree climbing stick system 10. System 110 is similar to system 10 except that system 110 comprises inter-stick locking mechanism 250, another example of inter-stick locking mechanism 50. Those remaining components of system 210 which correspond to system 10 are numbered similarly in FIGS. 4A, 4B or are shown in FIG. 1.

Inter-stick locking mechanism 250 comprises a U-shaped arm or bracket 253 having a cavity opening 254 formed along a side of step support 21, such as a post, of a first stick 20. As shown by FIG. 4A, bracket 253 is pivotally supported by step support 21 for rotation about axis 259 such that opening 254 is rotatable over a top of a step support 21 of an adjacent tree climbing stick to receive the adjacent step support 21 of the adjacent stick 20. Bracket 253 is further rotatable about axis 259 out of engagement with respect to the adjacent step support 21 of an adjacent stick 20 as shown in FIG. 4B. In the example illustrated, bracket 253 is operably coupled to lever step 35, wherein rotation of lever step 35 rotates bracket 253 and opening 254 as shown in FIGS. 4A and 4B. FIG. 4A illustrates the adjacent stick 20 received within opening 254 to lock and secure the two adjacent sticks 20 relative to one another. FIG. 4B illustrates the bracket 253 and its opening 250 rotated out of engagement with the adjacent stick 20, allowing the two adjacent sticks 20 to be withdrawn and separated from one another.

FIGS. 5A-5D illustrate tree climbing stick system 310, another example implementation of tree climbing stick system 10. System 310 is similar to system 10 except that system 110 comprises inter-stick locking mechanism 350, another example of inter-stick locking mechanism 50. Those remaining components of system 310 which correspond to system 10 are numbered similarly in FIGS. 5A-5D or are shown in FIG. 1.

Inter-stick locking mechanism 350 comprises a receiver 352 having a cavity 354, connected to a first climbing stick 20 and having an asymmetric mouth 356 (shown in FIGS. 5B and 5D) leading to the cavity 356. The receiver 352, its cavity 354 and asymmetric mouth 356 rotate in response to rotation of lever step 35. The cavity 354 and the mouth 356 rotate between a first unlocked position (shown in FIGS. 5A and 5B) in which the mouth is able to receive an asymmetrically shaped head 360 of a locking member 358 projecting from a second climbing stick 20 or wherein the head 360 may be withdrawn from the cavity 359 and a second locked position (shown in FIGS. 5C and 5D) in which the asymmetrically shaped head 360 is out of alignment with the asymmetrically shaped mouth 356 while the head 360 is within the cavity 354 such that the head 360 cannot be moved through the mouth 356 and such that the head 360 is captured within the cavity 354 to retain or lock the first stick 20 and the second stick 20 relative to one another.

FIG. 6 is a perspective view of an example tree climbing stick 420 which is part of an overall system 410 facilitating the stacking and interconnecting of multiple sticks 420 for storage and transport. As will be described hereafter, tree climbing stick 420 has an asymmetrically shaped head is operably coupled to a lever step such that rotation of the lever step rotates the asymmetrically shaped head between a locked position and an unlocked position. In particular, rotation of the lever step rotates the asymmetrically shaped head between a first unlocked position in which the head is able to move through the asymmetrically shaped mouth of the other stick for insertion or withdrawal of the head into and out of the cavity and a second locked position in which the asymmetrically shaped head is out of alignment with the asymmetrically shaped mouth while the head is within the cavity such that had cannot be moved through the mouth and such that the head is captured within the cavity to retain or lock the first stick and the second stick relative to one another.

Tree climbing stick 20 is structured or configured to be mounted along a tree in a vertical orientation, providing a person with a ladder to climb the tree. Tree climbing stick 420 comprises a step support 421, tree gripping claws 426, cinch mount 428 and cinch 429, steps 434, lever step 435 and locking member 438. Step support 421 supports steps 434 and 435 vertically spaced possessions against a structure, such as a tree. In the example illustrated, step support 421 comprises post 422, step stoppers 430, 432. Post 22 comprises an elongated structure serving as a spine or backbone for supporting claws 426, step stoppers 430, 432, steps 434, 435 and cinch mount 428. FIG. 6 illustrates steps 435 in a withdrawn state with steps 434, 435 substantially aligned with the longitudinal length of post 422. FIGS. 7 and 8 illustrate steps 434, 435 rotated to extended or horizontal orientations, ready for being stepped on by a climber. FIG. 7 is a front view of the stick 420 while FIG. 8 is a side view of stick 420.

FIG. 9 is a perspective view of an example post 422 independent of the remaining components of stick 420. In the example shown in FIG. 9, post 422 comprises an elongated square or rectangular tube formed from a relatively strong and rigid material, such as a metal, such as aluminum or steel. In one implementation, post 422 comprises an extruded tube.

In the example illustrated, post 422 is configured to facilitate removal mounting of each of claws 426, cinch mount 428, stoppers 430, 432, and steps 434. In the example illustrated, post 422 is configured to facilitate the use of fasteners, such as nuts and bolts, for such mounting. As shown by FIG. 9, post 422 comprises claw fastener openings 440, stopper receiving openings 441, stopper/step fastener openings 442 and cinch mount fastener openings 443. As will be described hereafter, claw fastener openings 340 comprise bores at least partially through post 322 to receive fasteners for securing a tree claws 326 to and along post 322. In the example illustrated, openings 340 comprise a pair of openings extending to opposite walls of post 322. Stopper receiving openings 341 comprise openings configured to receive a portion of stoppers 430, 431 to secure one portion of each of stoppers 430, 431 along post 22. Stopper/step fastener openings 442 comprise bores at least partially through post 242 through which fasteners are inserted to further secure a second portion of each of stoppers 430, 431 to and along post 422 while also pivotally supporting a step 434, 435. In the example illustrated, openings 442 comprise a pair of openings throughout the walls of post 442. Cinch mount opening 443 comprises a bore at least partially through post 422 to receive a fastener to secure cinch mount 438 to post 422. In the example illustrated, opening 443 comprise a pair of openings extending through opposite walls of post 422. In each of such instances, the fastener received by such openings may comprise a fastener that is either independent of the structure being secured by the fastener, such as where the fastener comprises a bolt and associated nut, a screw or the like or a fastener that is integral as part of the structure being secured, such as where the structure has an integrally extending threaded shaft or an integral internally threaded bore.

Because post 422 comprises an elongated tube configured to releasably mount or releasably secure the other components such as claws 426, stoppers 430, 432, steps 434 and cinch mount 438, the geometry of such individual parts are simplified, facilitating easier and lower-cost manufacture. For example, tube 422 may be a simple extruded tube into which openings are removed through one or more available material removal techniques. Because post 422 facilitates removable mounting of such other components of stick 420, the other components of stick 420 may be more easily replaced when worn or damaged or may be more easily exchanged when components of stick 420 are to be updated or customized.

In yet other implementations, post 422 may have other configurations. For example, in other implementations, post 422 may be integrally formed as a single unitary body with one or more of the other components of stick 420. In other implementations, post 422 may be formed through a casting process, wherein post 422 is integrally formed as a single unitary body with one or more of the other components of stick 420. In other embodiments, in lieu of comprising a tube, post 422 may comprise a single solid bar, an I-beam or other supporting structure.

Figure 11:
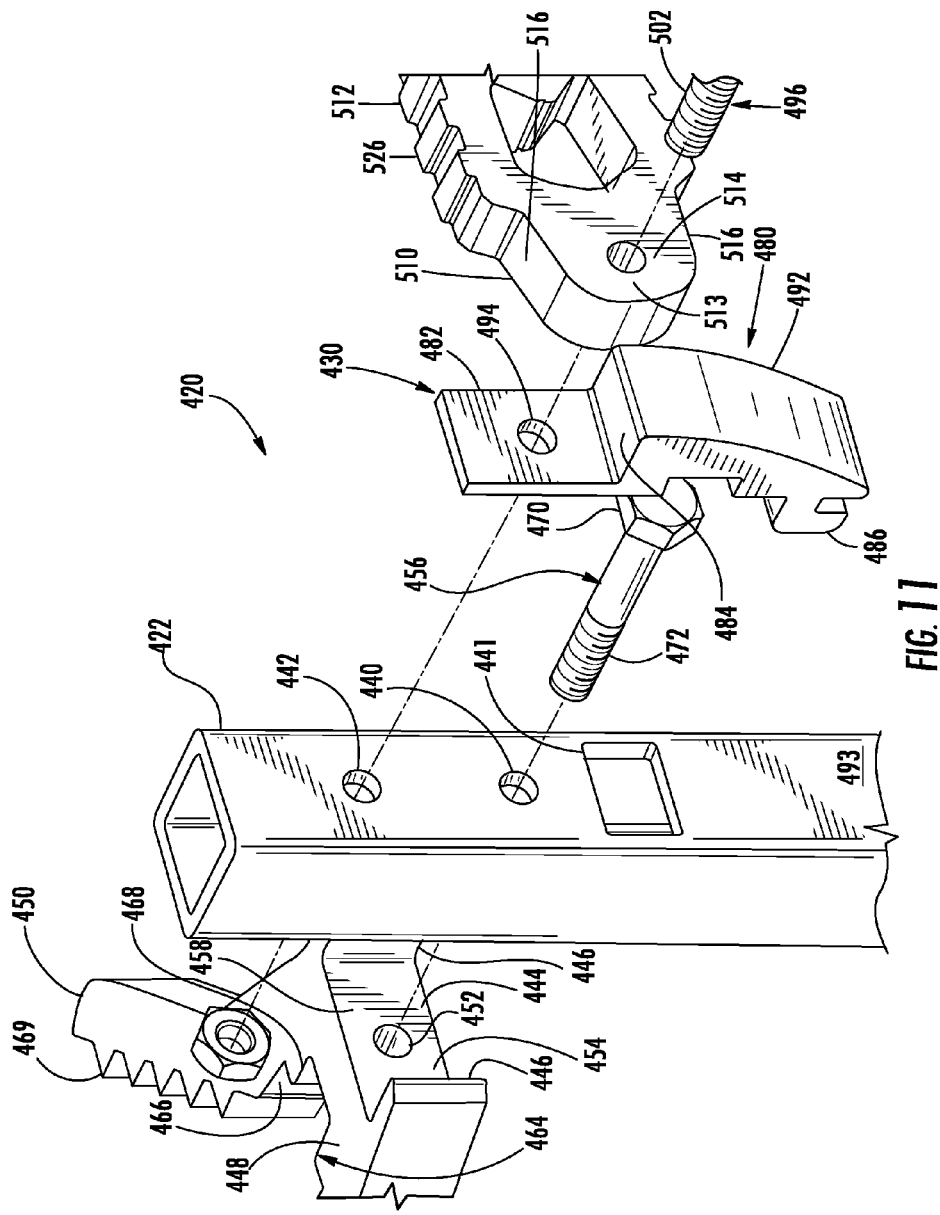
FIG. 11 is a second exploded fragmentary perspective view of the first portion of the example tree climbing stick of FIG. 6.
Figure 12:
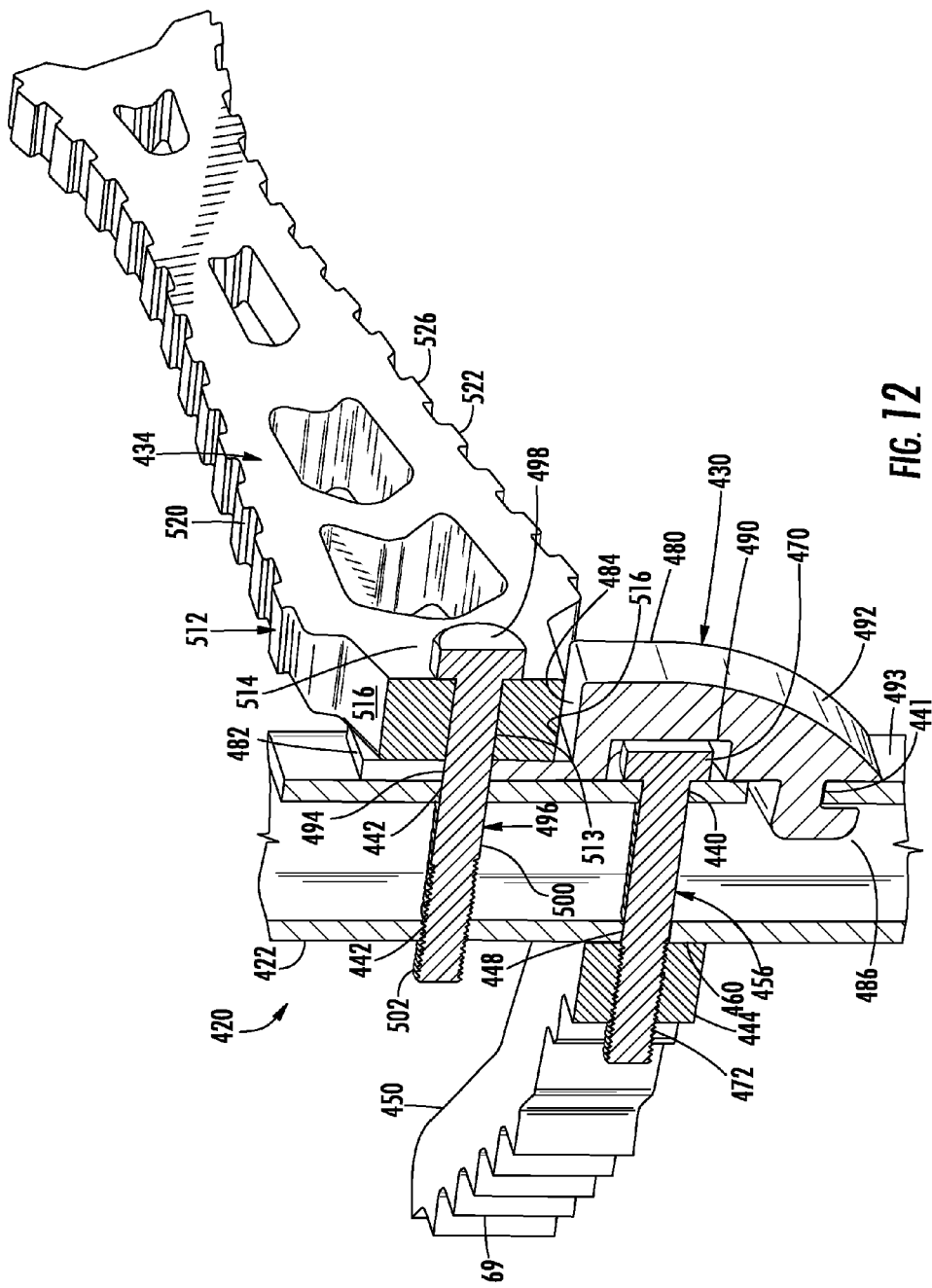
FIG. 12 is a sectional view of the first portion of the example tree climbing stick of FIG. 6.
Figure 13:
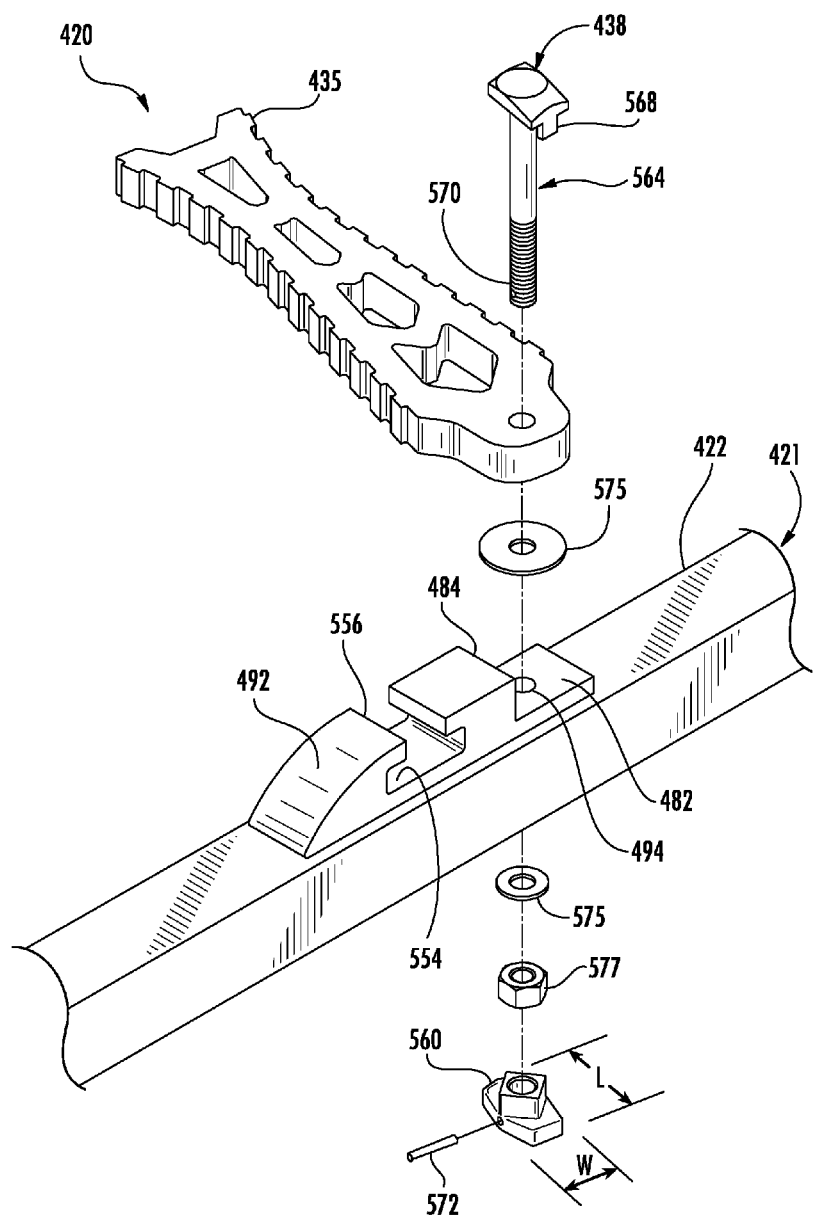
FIG. 13 is an exploded fragmentary perspective view of a second portion of the example tree climbing stick of FIG. 6.

FIGS. 10 and 11 are exploded perspective views illustrating an individual example tree gripping claw 426, an individual example step stopper 430 and an individual example step 434 in more detail and in relationship to the example post 422. FIG. 12 is a perspective view illustrating the individual tree gripping claw 426, the individual step stopper 430 in the individual step 434 assembled and mounted to post 422. FIG. 13 is a sectional view of the assembled portion of tree stick 22 shown in FIG. 5. As shown by FIGS. 10 and 11, tree gripping claws 426 comprise structures that engage and grip the sides of a tree to which stick 420 is to be mounted. Tree gripping claw 426 comprises a generally V-shaped bracket removably coupled or secured to post 422. Tree gripping claw 426 comprises base 444, ears 446, sidewalls 448 and wings 450. Base 444 comprises a structure having an opening 452 to receive claw fastener 456. In the example illustrated, base 444 has a rear face 458 shaped to correspond with the face 460 of post 422 such that face 458 may be positioned in close conformal abutting contact with face 460. In the example illustrated, faces 458 and 460 comprise flat planar surfaces. In other implementations, faces 458 and 460 may have other shapes.

Ears 446 project from base 444 on a first side of base 444 to form channel 454 with base 444 for forming a floor of the channel and with ears 446 forming opposite sides of the channel 454. Ears 446 wrap about opposite sides of post 422. Ears 446 inhibit rotation or pivoting of claw 426 about the axis of fastener 456 with respect to post 422. In other implementations, ears 446 may be omitted.

Sidewalls 448 project from base 444 on an opposite side of base 444 as compared to ears 446. Sidewalls 448 cooperate with base 444 to form a channel 464 facing in a direction opposite to the direction in which channel 454 faces. As will be described in more detail hereafter, channel 464 is sized and shaped to receive portions of post 422 of another climbing stick 420 being stacked relative to the illustrated climbing stick 420. In one implementation, channel 464 comprise a two-stepped channel having a first portion 66 with a first wider width to receive and accommodate a width of post 422 and a second portion 468 having a second narrower width to receive and accommodate portions of stopper 430 and/or step 434 of another adjacent climbing stick 420. Sidewalls 448 and the formed channel 464 facilitate nesting of multiple adjacently stacked climbing sticks 420 that form a climbing stick system.

Wings 450 divergently extend away from one another and away from sidewalls 48 on opposite sides of channel 464. Wings 450 form a V-shaped opening that receives the side of a tree. Each of wings 450 has mutually facing surfaces supporting teeth 469. Teeth 469 grip the sides of a tree along which stick 420 is mounted. In other implementations, wings 450 and claw 426 may have other configurations.

As shown by FIGS. 12 and 13, claw 426 is mounted to post 422 by fastener 456 which extends through and associated claw fastener opening 440 and through opening 452 in base 444 of claw 426. In the example illustrated, fastener 456 comprises a bolt having a head 470 and a threaded end portion 472 upon which a threaded nut 473 is screwed or threaded so as to capture post 422 and claw 426 between head 470 and nut 473. Nut 473 is located within a portion 460 of channel 464. In other implementations, nut 473 may be located within a countersink or recess formed within base 444, within the floor of portion 468 of channel 464.

In other implementations, claw 426 may be secured to post 422 in other fashions. For example, in other implementations, threaded portion 472 may be provided on a shaft integrally extending from post 422. In yet another implementation, fastener 456 may extend through claw 426 and post 422 in an opposite fashion, wherein head 470 is located within channel 464 while nut 473 is located on an opposite side of tube 422 adjacent stopper 430.

Cinch mount 428 (shown in FIG. 6) extends from post 422 and comprises cinch retaining head 540 and neck 542. Cinch mount 438 facilitates the securement of a cinch strap 429. In one implementation, strap 429 comprises a slit 441 along the strap to be inserted over the head 540 so as to extend about neck 542, strap 429 is captured between post 422 and head 540. Cinch strap 429 facilitates further securement and retention of stick 422 vertically along a tree, such as shown in FIG. 7A.

Step stopper 430 comprises a structure configured to support and retain its associated step 434 in a horizontal state when use, when being climbed upon, while allowing the associated step 434 to be pivoted to an inactive or withdrawn state in which the associated step 434 extends parallel to the major dimension or longitudinal length of post 422, making stick 420 more compact for transport and storage by reducing the extent of projecting structures and allowing stick 420 to be more easily carried with a reduced likelihood of stick 420 catching upon external structures. In the example illustrated, step stopper 430 allows the associated step 434 to be pivoted to one of two available horizontal positions, projecting to the left or to the right of post 422. In other implementations, step stopper 430 may alternatively allow the associated step 434 to be pivoted to between the inactive orientation and only one side of post 422.

In the example illustrated, step stopper 430 is configured to be releasably mounted to post 422, facilitating simpler construction of stop 430 and post 422, facilitating easier shipment of stick 420 (in a disassembled state) and facilitating repair or replacement of stopper 430. Step stopper 430 comprises lower body 480, upper body 482, shelf 484 and projection 486. Lower body 480 extends over head 470 of fastener 456. As shown by FIG. 13, lower body 480 has a cavity 490 which receives head 470 of fastener 456. As a result, lower body 480 conceals head 470 of fastener 456 introduces the likelihood of items catching upon the edges of head 470. In the example illustrated, cavity 490 comprises a channel extending across lower body 480. In other implementations, cavity 490 may comprise a cylindrical bore drilled into lower body 480 or a polygonal opening formed or cast in lower body 80 while being sized to receive head 470. To further reduce the likelihood of external objects, clothing, bags or other articles catching upon climbing stick 420, lower body 480 further comprises a surface 492, facing in a direction away from post 422 on an opposite side of lower body 480 as cavity 490, that smoothly transitions to face 493 of post 422. In the example illustrated, surface 492 comprises an arcuate convex surface that curves to surface 93. In other implementations, surface 492 may comprise an angled tapered surface or ramp that ramps down to surface 493.

Upper body 482 extends upwards from lower body 480 and abuts face 493 of post 422 on one side and step 434 on the other side. Upper body 482 includes a bore, opening or aperture 494 for reception of a fastener 496 that secures both stopper 430 and step 434 to post 422. Upper body 482 is recessed relative to surface 492 of lower body 480 so as to form shelf 484.

Shelf 484 comprise a step or shoulder configured to abut step 434 when step 434 has been pivoted to one of the two available horizontal positions. At the same time, shelf 484 is sufficiently spaced from step 434 to allow step 434 to pivot to the withdrawn or in active state shown in FIG. 6.

Projection 486 extends from lower body 480 in a direction away from the surface 492. Projection 486 is sized and shaped to be received within aperture 441 of post 22. Projection 486 facilitates quick and tool is the initial connection of stopper 430 to post 422. Projection 486 retains stopper 430 with respect to post 422 while upper body 482 and step 434 are being secured to post 422 by fastener 496. Projection 486 cooperates with fastener 496 to provide to mounting locations to stopper 430 so as to inhibit rotation of stopper 430. In one implementation, projection 486 is integrally formed as a single unitary body with lower body 480 out of a rigid material, such as a metal, such as aluminum, wherein aperture 441 is sized larger than projection 486 to facilitate its insertion into aperture 441. In another implementation, projection 486 comprises a separate member or structure fastened are mounted to lower body 480. In one implementation, projection 486 comprises a separate member or structure, such as a knob, bulbous member, or the like, fastened or otherwise secured to lower body 80 and formed from an a resiliently flexible or elastomeric material, wherein the knob or bulbous member is sized larger than aperture 441, but resiliently compresses or flexes during insertion through after 441 so as to "pop" into place, resiliently returning to an uncompressed or default state upon full insertion, thereby retaining lower body 80 of stopper 430 to post 422.

Projection 486 and fastener 496 cooperate to secure stopper 430 to face 493 of post 422. In the example illustrated, fastener 494 comprises a bolt having a head 498, a shaft portion 4100 and a threaded portion 502 which threadably receives nut 504 (shown in FIG. 10). As shown by FIG. 13, upon stopper 430 being assembled to post 422, projection 486 is received within aperture 441 and fastener 496 extends through step 434 and openings 494 and 442 such that head 498 captures step 434 and upper body portion 482 against face 493 of post 422. Threaded end portion 502 projects through the other side of post 422 and is secured in place by nut 504. As a result, fastener 496 is employed in an arrangement such that fastener 496 serves dual functions: securing stopper 430 to post 422 also securing step 434 to post 422, reducing parts, cost and complexity of assembly. In other implementations, step 434 may be pivotably secured to post 422 at other locations and in other fashions independent of the securement of stopper 430 to post 422.

Figure 14:
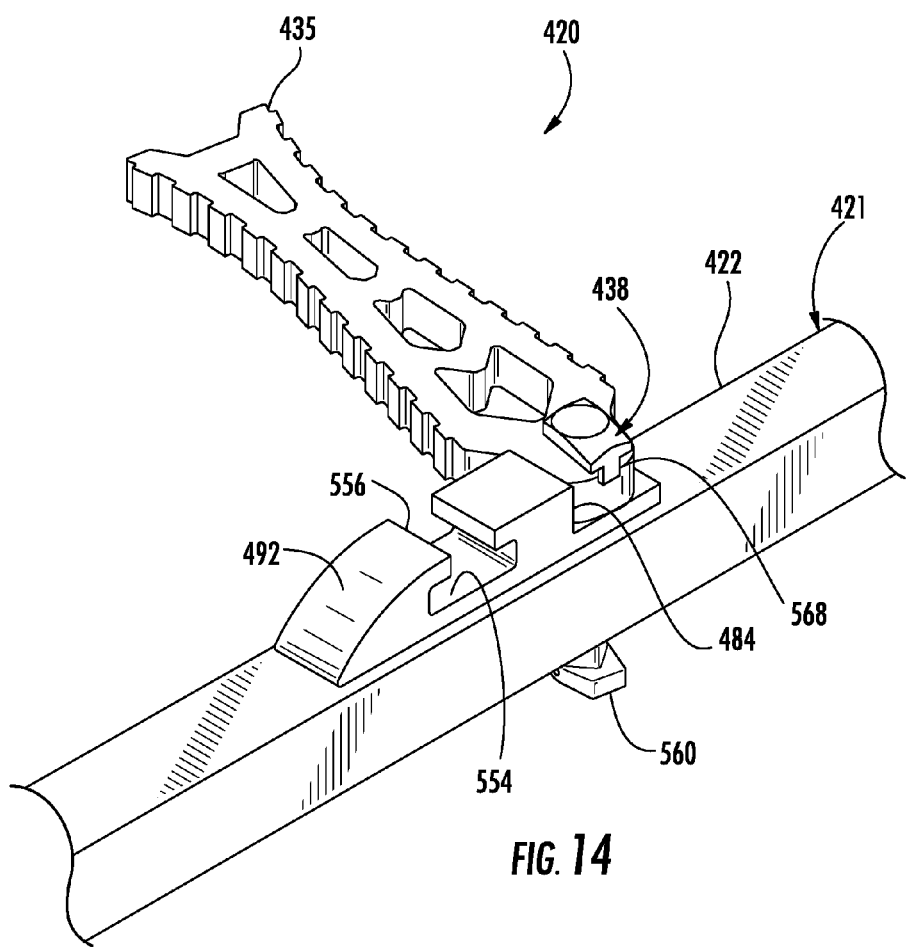
FIG. 14 is a fragmentary perspective view of the second portion of the example tree climbing stick of FIG. 6.

Stopper 432 is shown in more detail in FIGS. 13 and 14. Step stopper 432 is similar to step stoppers 430 except that step stopper 432 omits cavity 490 along its rear face and instead comprises cavity 554 and mouth 556 along its front face or front surface 492. As will be described hereafter, cavity 554 and mouth 556 serve as part of an inter-stick locking mechanism. Cavity 554 is at least partially bounded by interior surfaces of stopper 432. Cavity 554 is sized larger than mouth 556. Mouth 556 leads to cavity 554. Mouth 556 overhangs cavity 554. In the example illustrated, both cavity 554 and mouth 556 extend completely through stopper 432, extending from one side of stopper 432 to the other side of stopper 432. As a result, stopper 432 is more easily manufactured. In yet other implementations, cavity may be completely enclosed but for mouth 556. In other implementations, 556 may comprise a completely bounded opening through surface 492.

Step 434 (shown in FIGS. 10-12) comprises a rigid member configured to pivot relative to post 242 and stopper 340 between an inactive or withdrawn state (shown on the right side of FIG. 1) and an extended, in-use state shown in FIGS. 12 and 13, wherein step 434 rests upon stopper 430. The perimeter of step 434 is sufficiently spaced from the shoulder of stopper 430 such that step 434 may be freely rotated or pivoted between the inactive state or withdrawn state and either of the in use states, where step 434 rests upon the shoulder of stopper 430 while extending to the left of post 422 or while extending to the right of post 422, without step 434 having to be disconnected from post 422. As shown by FIGS. 6, 10 and 12, step 434 comprises base portion 510 and extension portion 512. Base portion 510 extends adjacent to stopper 430 and joins extension portion 512 to post 422 and stopper 430. In the example illustrated, base portion 510 comprises aperture 513 and support faces 516.

Aperture 513 comprises an opening through base portion 510 sized to receive shaft 500 of fastener 496. Support faces 516 comprise opposite surfaces on base portion 510 that are configured to abut shelf 484 when step 434 is pivoted to and extended, in-use position, extending either to the left or to the right of post 422. Support faces 516 are configured such that when the support faces 516 abut shelf 484, extension portion 512 extends substantially horizontal, substantially perpendicular to the longitudinal axis of post 422. In some implementations, faces 516 may be configured to cooperate with shelf 484 such that the centerline or longitudinal axis of extension portion 512 extends at a slightly upward inclined tilt, such as 5° to 20° above the horizontal which is perpendicular to the longitudinal axis of post 422. In other implementations, faces 516 cooperate with shelf 84 such as the centerline or longitudinal axis of extension post 512 extends perpendicular to the longitudinal axis of post 422.

As further shown by FIG. 12, extension portion 512 of step 434 comprises two opposite edges 520, 522. Edges 520, 522 serve as surfaces upon which a person's foot rests when step 434 is being used. In the example illustrated, each of edges 520, 522 is irregular, not smooth, to facilitate gripping and reduce the likelihood of accidental slippage. In the example illustrated, each of edges 520, 522 comprises a series of teeth, ribs or treads 526. In the example illustrated, each of edges 520, 522 has a an overall concave shape or profile (the concave, curved or arcuate plane extending across or through the endpoints or tips of each of treads 526 on one of edges 520, 522), tending to center a person's foot between the outer tip of step 434 and base portion 510. The concavity provide an edges 520, 522 faces substantially upwards, parallel to the longitudinal centerline or axis of post 422 (the longitudinal axis extending along the major dimension of post 422). Although step 434 is illustrated as having a foot supporting surface with treads 526 and the above-noted concavity on each of edges 520, 522, in other implementations, treads 526 and the concavity may alternatively be located on only one of edges 520, 522.

In some implementations, edges 520, 522 may have different configurations, such as different treads or teeth arrangements, allowing a person to choose which of the different available tread patterns he or she wants to use. For example in one implementation, the three steps 434 may be pivoted so as to extend left, right, and left to use a first tread configuration on the steps or may be pivoted so as to extend right, left and right to a second different tread configuration on the steps. In still other implementations, the user may customize stick 420 by flipping each of steps 434 180° to switch between which of edges 520, 522 faces upward when the particular step is pivoted to a horizontal in use position or state.

Lever step 435 is similar to each of steps 434 except that lever step 435 is pivotally coupled to post 422 by locking member 438. As with each of steps 434, step 435 comprises a rigid member configured to pivot relative to 5 stopper 430 between an inactive or withdrawn state (shown on the right side of FIG. 1) and an extended, in-use state, wherein step 435 rests upon stopper 432. As with steps 434, the perimeter of step 435 is sufficiently spaced from the shoulder of stopper 432 such that step 435 may be freely rotated or pivoted between the inactive state or withdrawn state and either of the in use states, where step 435 extends to the left of post 422, resting upon stopper 432 or where step 435 extends the right of post 422, resting upon stopper 432, without step 435 having to be disconnected from post 422.

Locking member 438 facilitates rotation of lever step 435 while, at the same time, using the torque or motion resulting from the rotation of lever step 435 to lock and unlock one stick 420 relative to another stick 420. Locking member 438 comprises a shaft extending and joined to lever step 435 at one end and an asymmetric head 560 extending from are joined to the shaft as an opposite end. Head 560 rotates in response to rotation of lever step 435. Head 560 rotates between an unlocked position in which head 560 may be moved through mouth 556 into cavity 554, facilitating separation of two adjacent sticks 420 and a locked position in which head 560 cannot move through mouth 556 such that once head 560 is rotated to the locked position within cavity 554, had 560 is captured within cavity 554, locking and securing two adjacent sticks to one another.

FIGS. 13 and 14 illustrate one example of locking member 438 in more detail. In the example illustrated, locking member 438 comprises bolt 564 and head 560. Bolt 564 extends through tube 422. Bolt 564 comprise a hook 568 at one end that engages a perimeter of lever step 435 such that rotation of lever step 4530 also rotates bolt 564.

In other implementations, bolt 564 may be connected to lever step 435 in other fashions. For example, in other implementations, hook 568 may engage other portions of step 435 such that rotation of step 435 also rotates bolt 564. For example, in other implementations, hook 568 may alternatively be captured within an opening extending through step 435. In yet other implementations, bolt 564 may be snapped, screwed, riveted, welded or the like to lever step 435. In other implementation, bolt 564 may be integrally formed as a single unitary body with lever step 435, wherein bolt 564 comprise a shaft extending from lever step 435.

Bolt 560 further comprises a bore 570 that receives the pin 572 by which head 560 is pinned to bolt 564. In other implementations, head 560 may be connected to bolt 564 in other fashions. For example, in other implementations, head 560 may be welded, snapped screwed on to bolt 564. In yet other implementations, head 560 may be integrally formed as a single unitary body with bolt 564. For example, in one implementation, head 560 may be molded or cast as part of bolt 564.

Head 560 comprises a structure extending from bolt 564 that is rotatable about the central axis of bolt 564 in response to rotation of lever step 435. Head 560 has a shape or perimeter about the central axis that is asymmetric (noncircular). In one implementation, head 560 has a major dimension L and a minor dimension W, both dimensions being perpendicular to the central axis of bolt 564. The major dimension L is the longest or greatest dimension of head 560 in a plane perpendicular to the central axis of the 564 while the minor dimension W is the largest dimension that is perpendicular to the major dimension L in the plane perpendicular to the central axis of bolt 564. In one implementation, head 560 has a general oval shape, wherein the longest length of the oval is the major dimension and the shortest width of the oval is the minor dimension.

As shown by FIG. 13, bolt 564 is additionally secured to post 521 by additional fastening components such as washers 575, 576 and threaded nut 577. In other implementations, bolt 564 may be secured to post 421 with additional or alternative fastening components. As noted above, in some implementations, head 560 may be integrally formed as part of a single unitary body or may be joined to bolt 564 in other fashions. In some implementations, such as where head 560 is integrally formed as part of a single unitary body as part of bolt 564, hook 568 and the head from which it extends may be provided as part of a nut or head that is pinned or screwed on to bolt 564 on an opposite end portion of bolt 564 as head 560.

Figure 15:
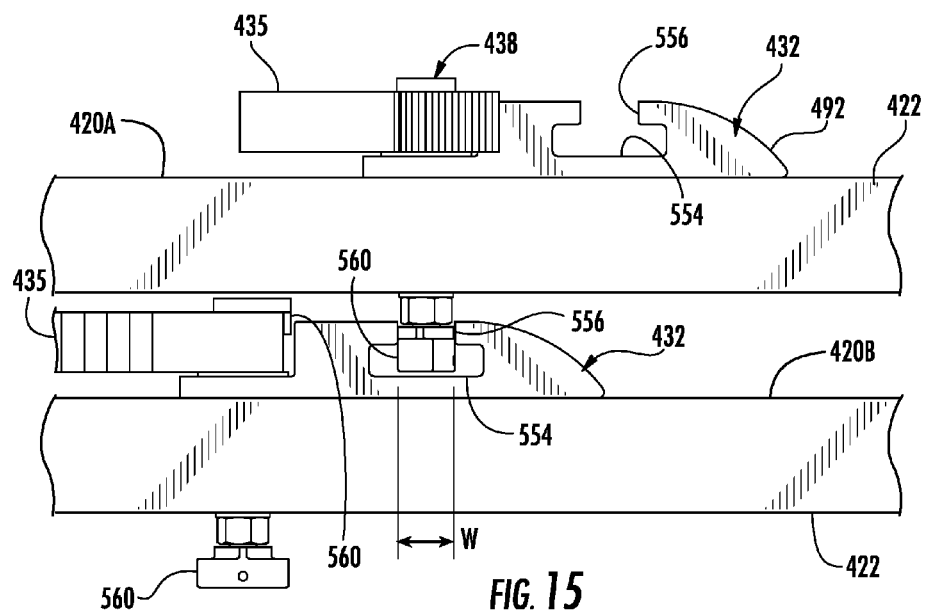
FIG. 15 is a fragmentary side view of the example tree climbing stick of FIG. 6 positioned adjacent to, but unlocked with respect to another example tree climbing stick.
Figure 16:
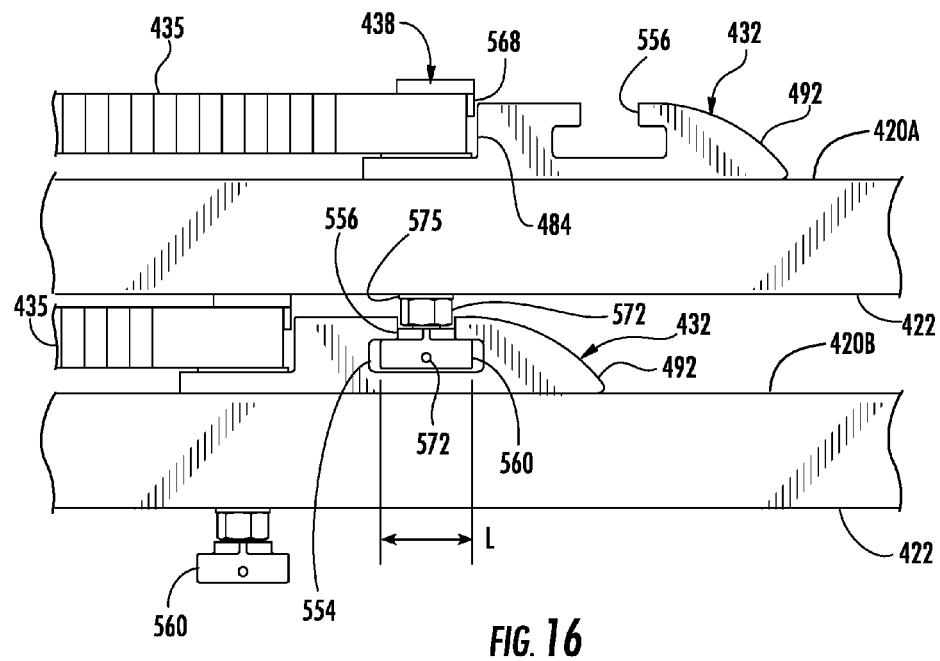
FIG. 16 is a fragmentary side view of the example tree climbing stick of FIG. 6 positioned adjacent to and locked with respect to the other example tree climbing stick.
Figure 17:
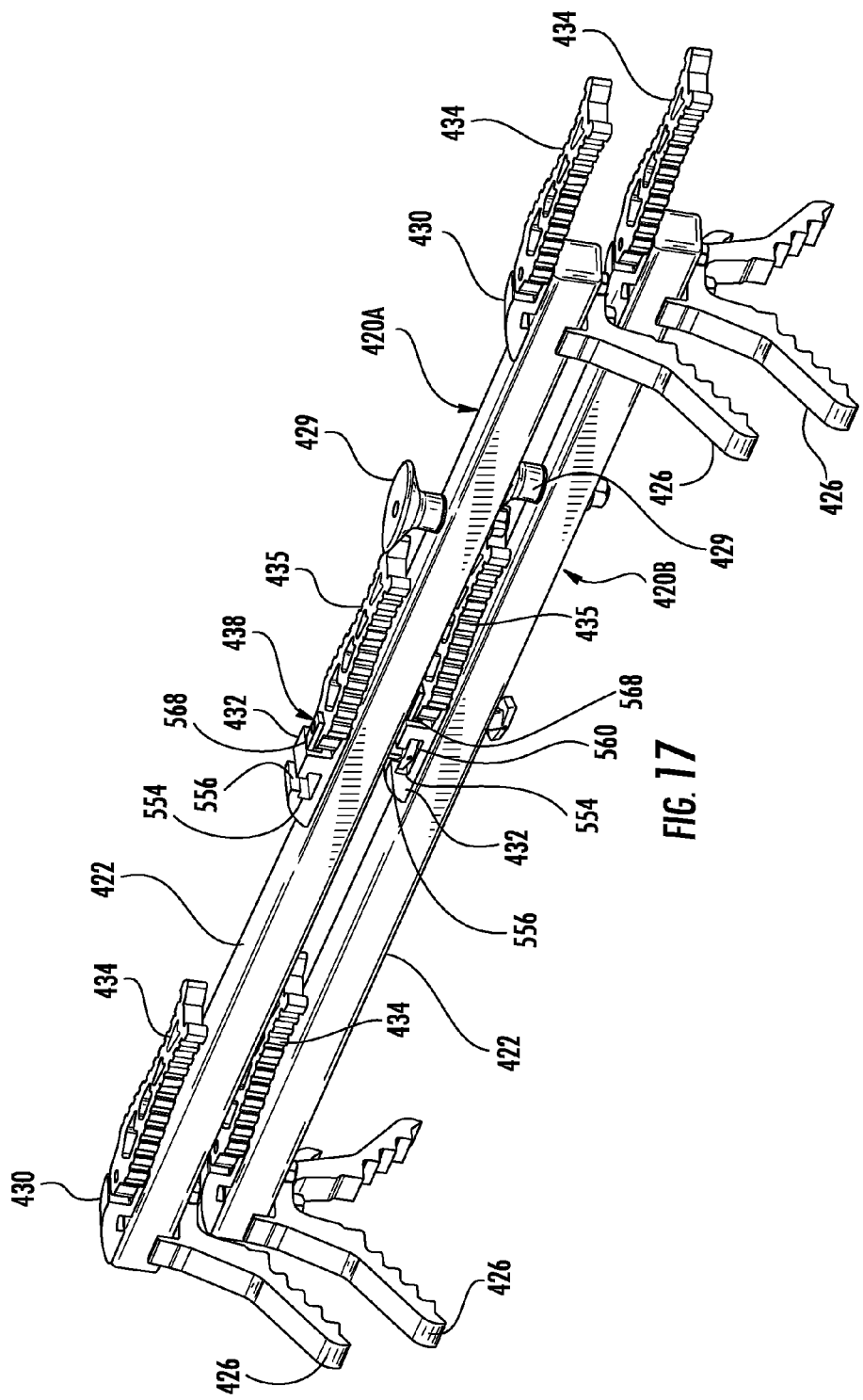
FIG. 17 is a perspective view of the example tree climbing stick system system.

FIGS. 15-17 illustrate connection of two identical sticks 420A and 420B using the inter-stick interlock mechanism provided by step stopper 432 and locking member 438. As shown by FIG. 15, sticks 420A and 420B are stacked relative to one another with posts 422 of sticks 420A and 420B extending parallel to one another and directly overlying one another in a staggered or offset relation such that the ends of such sticks 422 are offset relative to one another in a direction along the longitudinal axes of posts 422. Sticks 420A, 420B are positioned such that head 560 of the overlying stick 420A is aligned with mouth 556 of the underlying stick 420B. Step 435 is rotated to the in use or horizontal state in which step 435 extends substantially perpendicular to post 422 such that the minor dimension W of head 560 is aligned with the width of mouth 556 and such that head 560 is movable through mouth 556 into cavity 554 as shown by FIG. 15. In such a position, clause 426 further wrap about three sides of post 422 (as shown in FIG. 17) to inhibit sideways relative movement of posts 422.

As shown by FIGS. 16 and 17, once head 560 of the overlying stick 420A has been positioned within cavity 554 of the underlying stick 420B, lever step 435 is rotated to the withdrawn or out of use position or state in which step 435 extends substantially parallel to the longitudinal length of its corresponding post 422. Rotation of lever step 435 to the out of use or withdrawn position results in head 560 being rotated to the locking state shown in FIGS. 16 and 17 in which the major dimension L of head 560 extends parallel to the longitudinal length of post 422 such that head 560 extends below and beyond mouth 556 so as to be captured within chamber 554. As a result, sticks 420A and 420B are locked to one another. Sticks 420A, 420B cannot be moved sideways relative to one another due to the claws 426 of the overlying stick 420A receiving portions of the underlying stick 420B. At the same time, sticks 420A, 420B cannot be pulled directly apart or away from one another due to head 560 of the overlying stick 420A being captured within cavity 554 of stopper 432 of the underlying stick 420B. When sticks 420 are locked to one another, steps 435 do not extend from their corresponding posts 422, further providing a more compact storage and transport of the interlocked sticks 420A, 420B.

As shown by FIG. 18, separation of sticks 420A, 420B simply requires rotation of lever step 435 to the extended or in use position so as to rotate head 560 such that the minor dimension W of head 560 of the overlying stick 420A is once again is aligned with the width of mouth 556 of the underlying stick 420B. Sticks 420A and 420B may be simply pulled apart for use.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A climbing stick system comprising:
   a first climbing stick comprising:
      a first step support having a cavity therein and a mouth leading to the cavity; and
      first steps coupled to the first step support; and
   a second climbing stick comprising:
      a second step support;
      second steps coupled to the second step support; and
      a locking member having a head,
      wherein one of the mouth and the locking member is rotatable between a locked position in which the head is locked within the cavity to retain the first climbing stick with respect to the second climbing stick and an unlocked position to facilitate separation of the first climbing stick and the second climbing stick, wherein the second steps comprise a rotatable lever step that is operably coupled to said one of the mouth and the locking member to rotate said one of the mouth and the locking member, wherein the lever step is rotatable between an extended position extending outward from the first step support and an aligned position aligned with the first step support, wherein rotation of lever step to the aligned position rotates said one of the mouth and the locking member to the locked position and wherein rotation of the lever step to the extended position rotates said one of the mouth and the locking member to the unlocked position.

2. The climbing stick system of claim 1, wherein the cavity comprises a channel and wherein said head is movable in an arc into and out of the channel.

3. The climbing stick system of claim 2, wherein the first climbing stick and the second climbing stick extend parallel to one another and face one another in opposing directions when retained with respect to one another and wherein the channel faces in a direction orthogonal to the opposing directions.

4. The climbing stick system of claim 1, wherein the head is movable through the mouth in the unlocked position and is not movable through the mouth in the locked position so as to be captured within the cavity to retain the first climbing stick with respect to the second climbing stick.

5. The climbing stick system of claim 1, wherein the first climbing stick further comprises:
   a tree gripping claw; and
   a fastener securing the tree gripping claw to the post, wherein first step support further comprises a second stopper supported by the post, the second stopper comprising a cavity receiving a portion of the fastener.

6. The climbing stick system of claim 1, wherein the first step support comprises a post, the post having an outer wall forming the cavity and the mouth.

7. The climbing stick system of claim 1 further comprising a tree gripping claw.

8. The climbing stick system of claim 1, wherein the first climbing stick further comprises a claw, the claw comprising:
a channel receiving the second climbing stick; and
divergent wings extending from opposite sides of the channel.

9. A climbing stick system comprising:
a first climbing stick comprising:
a first step support having a cavity therein and a mouth leading to the cavity; and
first steps coupled to the first step support; and
a second climbing stick comprising:
a second step support;
second steps coupled to the second step support; and
a locking member having a head,
wherein one of the mouth and the locking member is rotatable between a locked position in which the head is locked within the cavity to retain the first climbing stick with respect to the second climbing stick and an unlocked position to facilitate separation of the first climbing stick and the second climbing stick, wherein the second steps comprise a rotatable lever step that is operably coupled to said one of the mouth and the locking member to rotate said one of the mouth and the locking member, wherein the first step support comprises:
a post; and
a stopper supported by the post, the stopper comprising the cavity, the mouth and a shelf that limits a degree of rotation of the lever step.

10. A climbing stick system comprising:
a first climbing stick comprising:
a first step support; and
first steps coupled to the first step support; and
a second climbing stick comprising:
a second step support;
second steps coupled to the second step support, the second steps comprising a rotatable lever step; and
an inter-stick locking mechanism operably coupled to the lever step, wherein rotation of the lever step relative to the second step support actuates the inter-stick locking mechanism between a locking state in which the inter-stick locking mechanism retains the first climbing stick relative to the second climbing stick and an unlocked state that facilitates separation and disconnection of the first climbing stick and the second climbing stick.

11. The climbing stick system of claim 10, wherein the inter-stick locking mechanism comprises:
a cavity provided by the first step support and a mouth leading to the cavity; and
a locking member having a head,
wherein one of the mouth and the locking member is rotatable between a locked position in which the head is locked within the cavity to retain the first climbing stick with respect to the second climbing stick and an unlocked position to facilitate separation of the first climbing stick and the second climbing stick.

12. The climbing stick system of claim 11, wherein the cavity comprises a channel and wherein head is movable in an arc into and out of the channel.

13. The climbing stick system of claim 12, wherein the first climbing stick and the second climbing stick extend parallel to one another and face one another in opposing directions when retained with respect to one another and wherein the channel faces in a direction orthogonal to the opposing directions.

14. The climbing stick system of claim 11, wherein the head is noncircular and wherein the head is movable through the mouth in the unlocked position and is not movable through the mouth in the locked position so as to be captured within the cavity to retain the first climbing stick with respect to the second climbing stick.

15. The climbing stick system of claim 10, wherein the inter-stick locking mechanism comprises a hook rotatably supported by the first step support, the hook being rotatable between a locking position in which the hook hooks about the first step support when the inter-stick locking mechanism is in the locking state and an unlocked position in which the hook is withdrawn from the first step support when the inter-stick locking mechanism is in the unlocked state.

16. The climbing stick system of claim 10, wherein the lever step is rotatable relative to the second step support between a first position in which the lever step extends from a first side of the second step support and a second position in which the lever step extends from a second side of the second step support, the second side being opposite the first side.

17. A tree climbing stick comprising:
a step support having a cavity therein and a mouth leading to the cavity;
a first step supported by the step support; and
a locking member rotatably supported by the step support, the locking member having a noncircular head, the locking member being rotatable between a locked position in which the head is configured to be locked within the cavity of another tree climbing stick to retain the tree climbing stick with respect to the other tree climbing stick and an unlocked position configured to facilitate separation of the tree climbing stick and the other tree climbing stick.

18. The tree climbing stick of claim 17 further comprising a lever step rotatably supported by the step support and operably coupled to the locking member to rotate the locking member.

19. The tree climbing stick of claim 18, wherein the step support comprises:
a post; and
a stopper supported by the post, the stopper comprising the cavity, the mouth and a shelf that limits a degree of rotation of the lever step.

20. The tree climbing stick of claim 18, wherein the lever step is rotatable relative to the step support between a first position in which the lever step extends from a first side of the step support and a second position in which the lever step extends from a second side of the step support, the second side being opposite the first side.

* * * * *